United States Patent
Osti et al.

[11] Patent Number: 5,941,367
[45] Date of Patent: Aug. 24, 1999

[54] OUTPUT UNIT FOR A CONTINUOUS WRAPPING MACHINE

[75] Inventors: Roberto Osti, Zola Predosa; Fiorenzo Draghetti, Medicina, both of Italy

[73] Assignee: G.D Societa' Per Azioni, Bologna, Italy

[21] Appl. No.: 08/807,707

[22] Filed: Feb. 28, 1997

[30] Foreign Application Priority Data

Mar. 1, 1996 [IT] Italy ................................ BO96A0101

[51] Int. Cl.$^6$ .................................................. B65G 29/00
[52] U.S. Cl. ...................................... 198/475.1; 198/800
[58] Field of Search .............................. 198/475.1, 800, 198/474.1

[56] References Cited

U.S. PATENT DOCUMENTS

| | | | |
|---|---|---|---|
| 3,603,479 | 9/1971 | Kuster | 198/475.1 |
| 3,795,302 | 3/1974 | Schoppee | 198/475.1 |
| 3,868,009 | 2/1975 | Billi et al. | 198/475.1 |
| 3,992,855 | 11/1976 | Palmieri et al. | 198/475.1 |
| 4,066,162 | 1/1978 | Miaskoff | 198/475.1 |
| 4,199,288 | 4/1980 | Ganz et al. | 198/475.1 |
| 4,645,063 | 2/1987 | Seragnoli | 198/475.1 |
| 4,846,337 | 7/1989 | Kuhlmann | 198/475.1 |
| 5,101,956 | 4/1992 | Gambetti | 198/475.1 |
| 5,318,165 | 6/1994 | Spatafora et al. | 198/475.1 |
| 5,542,233 | 8/1996 | Graffin | 198/475.1 |

FOREIGN PATENT DOCUMENTS

| | | |
|---|---|---|
| 0663341 | 7/1995 | European Pat. Off. . |
| 6-24551 | 2/1994 | Japan ..................... 198/475.1 |

Primary Examiner—Janice L. Krizek
Assistant Examiner—Thuy V. Tran
Attorney, Agent, or Firm—Lada & Parry

[57] ABSTRACT

An output unit for a continuous wrapping machine, wherein packets, substantially in the form of a rectangular parallelepipedon and laid flat on respective seats of a continuous conveyor wheel, are fed by the wheel crosswise to a small lateral surface of the packets, and are transferred onto an intermediate conveyor, which receives each packet from the respective seat, feeds the packet parallel to itself along a substantially 90° conveying arc, and unloads the packet onto an output conveyor tangent to the output end of the conveying arc and traveling continuously in a direction crosswise to a large surface of the packet.

7 Claims, 2 Drawing Sheets

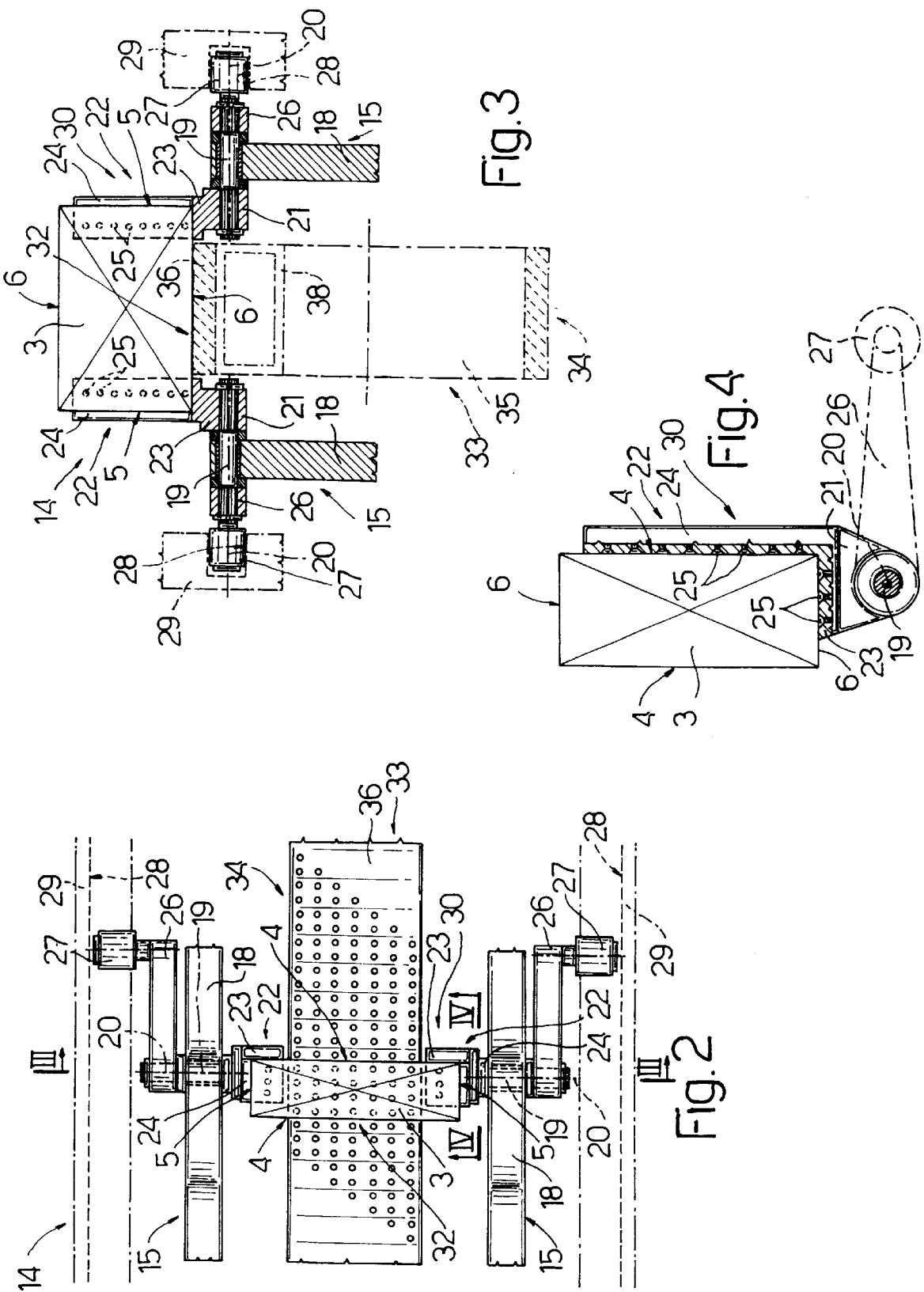

OUTPUT UNIT FOR A CONTINUOUS WRAPPING MACHINE

BACKGROUND OF THE INVENTION

The present invention relates to an output unit for a continuous wrapping machine.

The present invention may be used to advantage in the tobacco industry, and in particular on machines for wrapping and/or overwrapping packets of cigarettes—hereinafter referred to generally as wrapping machines—to which specific reference is made in the following description purely by way of example.

Continuous machines for wrapping packets of cigarettes normally comprise a wrapping line defined by a number of conveyor wheels tangent to one another in cascade fashion, and each having a number of peripheral seats for receiving respective packets. The packets, which are substantially in the form of a rectangular parallelepipedon, are fed along the wrapping line, passing from one wheel to another at the point of tangency between the wheels, and are manipulated both as they are transferred from one wheel to another, and as they are fed forward by each wheel.

Continuous wrapping machines are known to feature conveyor wheels with seats for receiving the respective packets laid flat, i.e. with a large lateral surface facing outwards, and for feeding the packets in a direction crosswise to a small lateral surface.

Though particularly advantageous in the sense that each packet is transferred from the respective seat on one wheel to the respective seat on the next wheel along a relatively short path and therefore relatively quickly, the above seat arrangement poses problems at the output of the wrapping line, where the packets, still laid flat, take up a relatively large amount of space on the output conveyor. As this, in most cases, is a stabilizing conveyor on which the packets must be kept for a given minimum stabilizing time, the above seat arrangement requires the use of relatively long, fast stabilizing conveyors.

SUMMARY OF THE INVENTION

It is an object of the present invention to provide an output unit for a continuous wrapping machine, designed to overcome the aforementioned drawback.

According to the present invention, there is provided an output unit for a continuous wrapping machine, the unit comprising a continuous input conveyor having a number of first seats, each for housing a respective packet substantially in the form of a rectangular parallelepipedon and laid flat on the first seat to travel, with said input conveyor, in a direction crosswise to a respective small lateral surface; and a continuous output conveyor for successively receiving said packets; the unit being characterized by also comprising an intermediate conveyor, in turn comprising a number of second seats, each for receiving a respective packet from a respective said first seat at a transfer station; actuating means being provided to maintain each second seat parallel to itself along a conveying arc of substantially 90°, said arc extending from said transfer station to an unloading station where the packets are unloaded onto the output conveyor, which is tangent to said arc at the unloading station.

BRIEF DESCRIPTION OF THE DRAWINGS

A non-limiting embodiment of the present invention will be described by way of example with reference to the accompanying drawings, in which:

FIG. 2 shows a larger-scale plan view of a detail in FIG. 1;

FIG. 3 shows a section along line III—III in FIG. 2;

FIG. 4 shows a section along line IV—IV in FIG. 2.

DETAILED DESCRIPTION OF THE INVENTION

Figure 1:
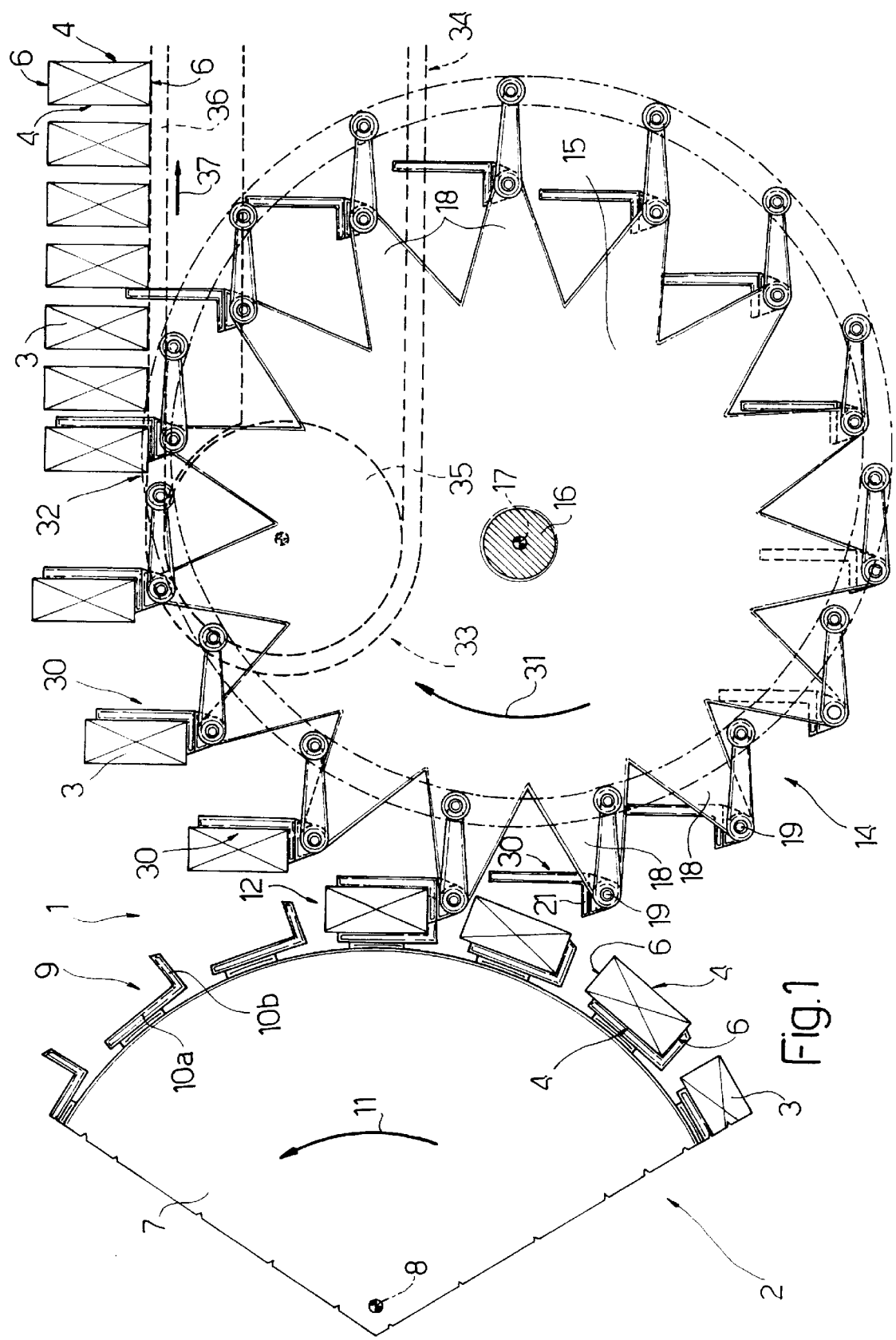
FIG. 1 shows a schematic side view, with parts removed for clarity, of a preferred embodiment of the output unit according to the present invention.

Number 1 in FIG. 1 indicates an output unit for a continuous wrapping machine 2 for wrapping packets 3 substantially in the form of a rectangular parallelepipedon and defined by two large lateral surfaces 4 and by four small surfaces, a first two of which—indicated by 5 (FIGS. 2–4)—are two opposite end surfaces crosswise to surfaces 4, and a second two of which—indicated by 6—are two small lateral surfaces perpendicular to surfaces 4 and 5.

Unit 1 comprises an input conveyor wheel 7 rotated continuously and anticlockwise (in FIG. 1) about an axis 8 perpendicular to the FIG. 1 plane by a known actuating device (not shown). Wheel 7 comprises a number of peripheral seats equally spaced about axis 8, and each defined by an L-shaped seat 9 comprising a first arm 10a substantially tangent to the periphery of wheel 7, and a second arm 10b extending substantially radially outwards from wheel 7. Each seat 9 receives a respective packet 3 laid flat, i.e. with a large lateral surface 4 contacting arm 10a, and feeds packet 3 to a transfer station 12 in a direction 11 crosswise to surfaces 6.

The width of each seat 9, measured parallel to axis 8, is less than the longitudinal length of respective packet 3, so that, in use, two longitudinal end portions of packet 3 project outwards of seat 9 in a direction parallel to axis 8.

Unit 1 also comprises an intermediate transfer conveyor 14, which in turn comprises two coaxial star wheels 15 separated by a given distance and both fitted to a shaft 16 to rotate continuously clockwise (in FIG. 1) about a common axis 17 parallel to axis 8. Each wheel 15 comprises a number of peripheral radial tips 18, each aligned with a corresponding tip 18 on the the other wheel 15, and each supporting for rotation a respective pin 19, the axis 20 of which is parallel to axis 8 and coaxial with axis 20 of pin 19 of the corresponding tip 18 on the other wheel 15.

As shown more clearly in FIGS. 2 to 4, each pin 19 is fitted with a substantially triangular bracket 21, which in turn is fitted integrally with a substantially L-shaped half-seat 22 separated from the corresponding half-seat 22 on the other pin 19 by a distance smaller than the length of packet 3 and approximately equal to but no smaller than said width of seat 9. Each half-seat 22 comprises a bottom arm 23 and a top arm 24 perpendicular to respective arm 23, and both arms 23, 24 comprise active surfaces with a system of suction holes 25 connected in known manner (not shown) to a known suction pump (not shown). Each pin 19 is also fitted with one end of a lever 26, which is fitted in rotary manner at the other end with a tappet roller 27 moving in contact with an annular active profile 28 of a cam 29.

Profiles 28 of both cams 29 are identical and such as to keep the active surfaces of arms 23 and 24 of each half-seat 22 coplanar with the active surfaces of arms 23 and 24 of the corresponding half-seat 22 on the other wheel 15; and the two half-seats 22 so positioned define a seat 30 for receiving and supporting a respective packet 3 with a surface 6 contacting arms 23, and a surface 4 contacting arms 24 of the two respective half-seats 22. Profiles 28 of both cams 29 are also so formed as to keep arms 24 of each seat 30 substantially vertical and parallel to arm 10a of a corresponding seat 9 in the region of transfer station 12, where the path of each seat 30 is substantially tangent to the path of seats 9. More specifically, at station 12, arms 24 of each seat 30 are separated from arm 10a of corresponding seat 9 by a distance equal to the thickness of packet 3, and arm 10b of each seat 9 engages the space between arms 23 of corresponding seat 30. Profiles 28 of both cams 29 are also so formed as to keep arms 23 of each seat 30 substantially horizontal along the whole of a conveying arc extending substantially 90° about axis 17 in a direction 31 and up to an unloading station 32. In other words, profiles 28 are so formed as to rotate seats 30 about respective axes 20 by the same amount and in the opposite direction to wheels 15 about axis 17, so that, in use, seats 30 travel between stations 12 and 32 parallel to themselves, with arms 23 positioned substantially horizontally.

Unit 1 also comprises an output conveyor 33, the belt 34 of which is looped about two pulleys 35, only one of which is shown and is located in the space between wheels 15. One of pulleys 35 is powered to move an upper conveying branch 36 continuously in a direction 37, parallel to direction 31 at station 32 and crosswise to surfaces 4 of packets 3, and along a path extending through unloading station 32 and tangent, at station 32, to the output end of said conveying arc.

As shown in FIGS. 2 to 4, belt 34 is a perforated belt narrower than the distance between half-seats 22 of each seat 30, and branch 36 travels in contact with a suction box 38 connected in known manner (not shown) to a known suction pump (not shown).

In actual use, each packet 3 is fed by respective seat 9 to station 12 in time with a respective seat 30, which, as it travels through station 12, receives packet 3 from seat 9, and supports packet 3 with a large lateral surface 4 contacting respective arms 24, and with a respective surface 6 contacting respective arms 23. Subsequently, packet 3 is retained contacting respective seat 30 by suction through holes 25, and travels, together with seat 30, to station 32. Throughout its travel along the conveying arc between stations 12 and 32, packet 3 is maintained with surfaces 6 parallel to direction 37, and with surfaces 4 crosswise to direction 37, and is kept in this position until, at station 32, arms 23 are first positioned coplanar with and then beneath upper branch 36 of belt 34, to release packet 3 onto belt 34 in an on-edge position, i.e. in a position occupying a minimum amount of space in direction 37, with a surface 6 contacting branch 36.

Obviously, to enable "smooth" transfer of packets 3 from respective seats 30 onto branch 36 of belt 34 of conveyor 33, the suction through holes 25 is cut off in known manner at station 32.

We claim:

1. An output unit for a continuous wrapping machine, the unit (1) comprising a continuous input conveyor (7) having a number of first seats (9), each for housing a respective packet (3) substantially in the form of a rectangular parallelepipedon and laid flat on the first seat (9) to travel, with said input conveyor (7), in a direction crosswise to a respective small lateral surface (6); and a continuous output conveyor (33) for successively receiving said packets (3); the unit being characterized by also comprising an intermediate conveyor (14), in turn comprising a number of second seats (30), each for receiving a respective packet (3) from a respective said first seat (9) at a transfer station (12); actuating means (26, 27, 29) being provided to maintain each second seat (30) parallel to itself along a conveying arc of substantially 90°, said arc extending from said transfer station (12) to an unloading station (32). where the packets (3) are unloaded onto the output conveyor (33), which is tangent to said arc at the unloading station (32).

2. A unit as claimed in claim 1, characterized in that the intermediate conveyor (14) comprises two side by side wheels (15) integral with each other; said second seats (30) being located between said two wheels (15), being supported by said two wheels (15), and being movable with respect to the two wheels (15) so as to travel, in use, parallel to themselves along said conveying arc.

3. A unit as claimed in claim 2, characterized in that said output conveyor (33) extends at least partly between said two wheels (15).

4. A unit as claimed in claim 3, characterized in that said output conveyor (33) comprises a guide pulley (35) located between said two wheels (15), and a belt (34) extending about said pulley (35); the belt (34) comprising a conveying branch (36) tangent to said conveying arc at said unloading station (32); and each second seat (30) comprising two half-seats (22) supported by respective said wheels (15) and separated by a distance greater than a width of said belt (34).

5. A unit as claimed in claim 4, characterized in that each half-seat (22) is connected to the respective wheel (15) to rotate, with respect to the wheel (15), about a respective first axis (20) parallel to a second axis (17) of rotation of the wheel (15); said actuating means (26, 27, 29) imparting to the respective half-seat (22) a rotation, about the respective first axis (20), equal to and in an opposite direction to a rotation imparted to the respective wheel (15) about the second axis (17).

6. A unit as claimed in claim 5, characterized in that said actuating means (26, 27, 29) comprise, for each said half-seat (22), respective fixed cam means (29), and respective tappet means (26, 27) fitted to the half-seat (22) and cooperating with the respective cam means (29) to impart to the respective half-seat (22) said rotation about the respective first axis (20).

7. A unit as claimed in claim 4, characterized in that each half-seat (22) is substantially L-shaped.

* * * * *